Sept. 8, 1942.　　　　H. J. SAUER　　　　2,295,428
DIRECTION SIGNAL LAMP FOR MOTOR VEHICLES
Filed Nov. 25, 1938　　　　2 Sheets-Sheet 1
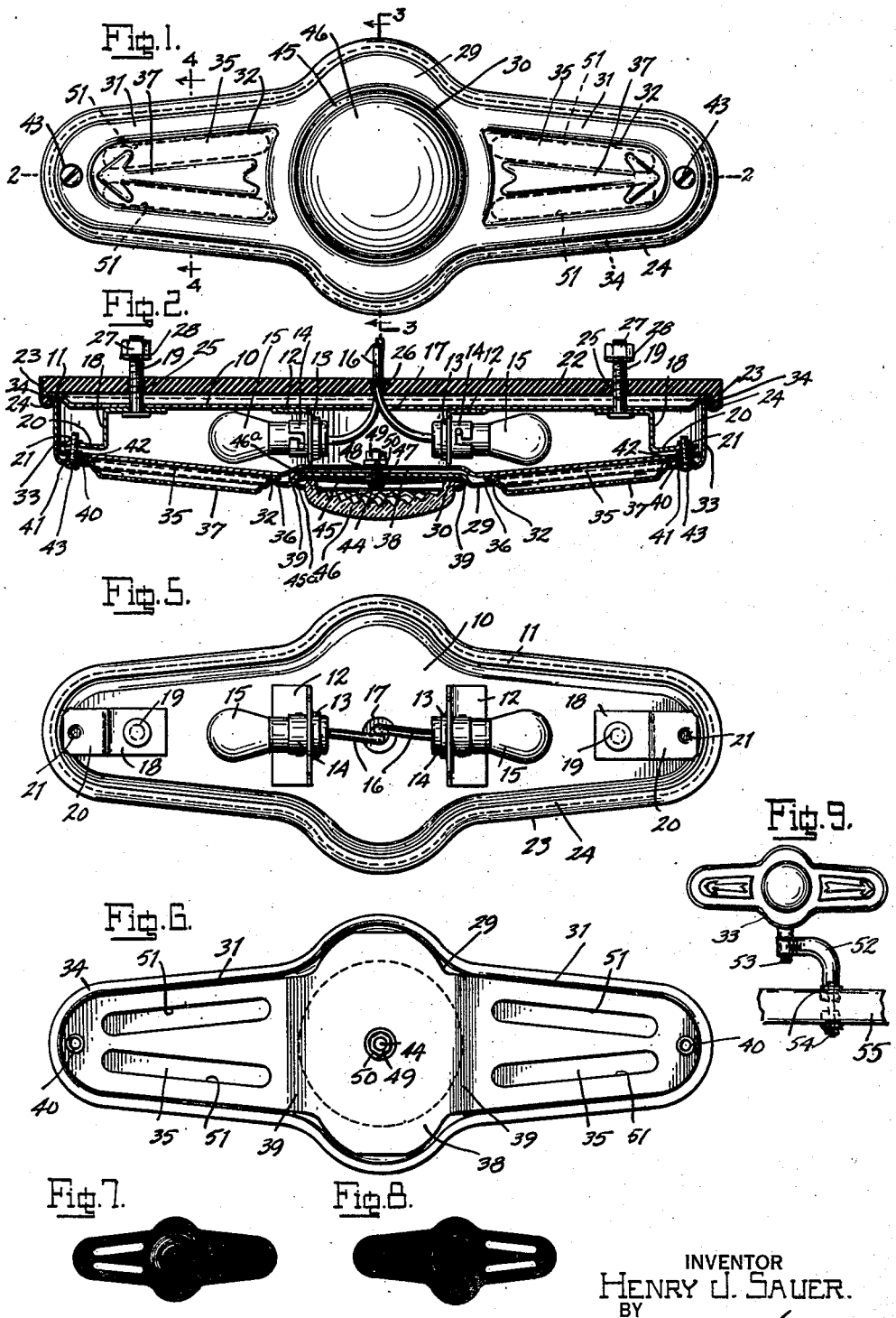
INVENTOR
HENRY J. SAUER.
BY
ATTORNEY Sept. 8, 1942.   H. J. SAUER   2,295,428
DIRECTION SIGNAL LAMP FOR MOTOR VEHICLES
Filed Nov. 25, 1938   2 Sheets-Sheet 2
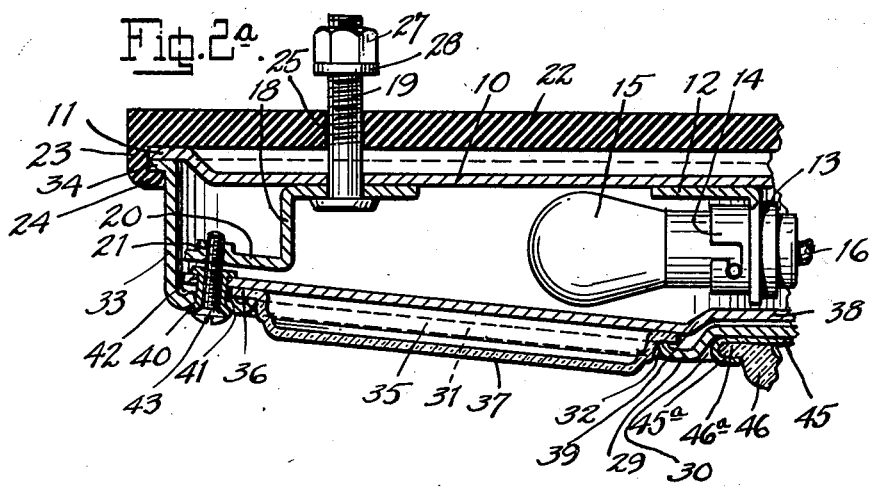
INVENTOR
HENRY J. SAUER.
BY
ATTORNEY Patented Sept. 8, 1942

2,295,428

UNITED STATES PATENT OFFICE 2,295,428

DIRECTION SIGNAL LAMP FOR MOTOR VEHICLES

Henry J. Sauer, Fairfield, Conn., assignor to The Kilborn-Sauer Company, Fairfield, Conn., a corporation of Connecticut Application November 25, 1938, Serial No. 242,393

1 Claim. (Cl. 177—329)

The present invention relates to a direction signal lamp for motor vehicles, particularly of the type adapted to be mounted upon the rear surface of the motor vehicle, as for instance the closure of the rear trunk compartment. As such lamps are in a conspicuous and exposed location, it is especially desirable that they be of an attractive appearance which will harmonize with the design of the motor vehicle, and may be attached thereto in such manner that they will not readily become loosened through vibration, and will be water tight so that water cannot enter either the trunk compartment or the interior of the lamp. It is an object of the present invention to provide a direction signal lamp which will meet these requirements, and at the same time will be of simple and inexpensive construction.

Another object is to provide a lamp structure which may be manufactured in standardized shape and at the same time will conform to variations in the curvature of the surface upon which the lamp is mounted, and to this end it is proposed to provide a rubber backing member of such thickness that it will conform to the surface of the motor vehicle, and at the same time will provide a watertight seal between the lamp and the motor vehicle structure, as well as a watertight seal for the interior of the lamp.

A further object is to provide a lamp structure which may be readily opened for the purpose of removing and renewing the lamp bulbs, and without disturbing the mounting of the lamp upon the motor vehicle structure.

A further object is to provide a direction signal lamp having autocollimating reflector means incorporated therein and which will be illuminated by the lights of a following automobile.

Another object is to provide right and left signal indicating means which will give a clear and distinct direction signal, and in which the center or filament point of the lamp bulb will be shielded, so as not to show a bright spot which will interfere with and diminish the intended visual effect of the signal. To this end it is proposed to provide a shielding means between the lamp bulb and the lens having direction indicating spaced slots which are disposed in converging arrow simulating arrangement outlining an opaque shielding portion between the slots which conceals the center or filament point of the lamp bulb. It is further proposed to provide direction signal lens means, the design of which may be developed independently of the arrangement of the direction indicating slots of the shielding means to the end that such lens means may have any desired direction indicating or other insignia moulded therein which will clearly show the intended function of the lamp in the day time, and when not illuminated. As such insignia may be shaped entirely independently of the arrangement of the illuminating direction indicating slots the design of such insignia may be carried out to meet artistic or other requirements, without sacrificing or compromising the functional characteristics of the illuminating direction indicating slots.

A further object is to provide a lamp structure in which the brackets for supporting the lamp bulbs and which are mounted upon the lamp base will form partitioning means for the right and left sides of the lamp when the removable cover is in place, so that when one side is illuminated the light rays will not penetrate the other side.

A further object is to provide means for securing in place the autocollimating reflector unit, and which means at the same time secures the right and left signal lenses in such manner that they will be securely pressed into water tight sealing relation with the casing.

With the above and other objects in view, an embodiment of the invention is shown in the accompanying drawings, and this embodiment will be hereinafter more fully described with reference thereto, and the invention will be finally pointed out in the claim.

In the drawings:

Fig. 1 is a front elevation of a direction signal lamp, according to the exemplary illustrated embodiment of the invention.

Fig. 2 is a horizontal sectional view taken along the line 2—2 of Fig. 1.

Fig. 2ᵃ is a horizontal sectional view similar to Fig. 2, on an enlarged scale, of the left-hand end of the signal lamp, the right-hand end being identical therewith.

Fig. 3 is a vertical sectional view, on an enlarged scale, taken along the line 3—3 of Fig. 1.

Fig. 4 is a vertical sectional view, on an enlarged scale, taken along the line 4—4 of Fig. 1.

Fig. 5 is a front elevation of the lamp base, the cover being removed.

Fig. 6 is a rear elevation of the cover, removed from the base.

Figs. 7 and 8 are diagrammatic views showing respectively the appearance of the direction signal lamp when illuminated to indicate left and right turn signals.

Fig. 9 is a front elevation showing a modified method of mounting the lamp.

Similar reference characters indicate corresponding parts throughout the several figures of the drawings.

Referring to the drawings, the direction signal lamp, according to the exemplary illustrated embodiment of the invention, comprises a sheet metal base member 10, the intermediate portion of which is widened in a vertical direction by rounding the upper and lower edges, and the end portions of which are tapered, the peripheral margin of the base member having a rearwardly offset rim 11 upon which the rim of the cover member is adapted to seat, as will hereinafter more fully appear.

At each side of the intermediate portion there is provided an angle bracket 12, the base of which is secured to the base member 10, preferably by spot welding, and the upright portion of which is provided with a flanged aperture 13 in which the lamp bulb receiving socket member 14 is secured, preferably by welding. The socket member 14 is of the well known bayonet type and is adapted to removably receive a light bulb 15. The lead wires 16 extending from the respective socket members 14 at each side, are carried through a central aperture 17 in the base member 10 and are adapted to be connected to suitable switch means provided in the motor vehicle for selectively lighting the light bulbs 15, depending upon whether a right or left turn signal is to be given.

Near each end of the base member 10 there is provided an angle bracket 18, the base of which is apertured and engaged by an attaching bolt 19 which projects rearwardly through the base 10, these bolts being for the purpose of attaching the lamp to the motor vehicle structure. The head of the bolt 19 and the base of the bracket 18 are rigidly secured to the base member 10, preferably by spot-welding. The bracket 18 is provided with an outwardly bent portion 20 having a countersunk threaded aperture 21 therein, which is for the purpose of securing the cover member by screws, as will hereinafter more fully appear.

The bracket members 12 are of such dimensions that in the engaged position of the cover they form partitioning means for providing right and left compartments within the lamp, in which the light bulbs 15—15 are respectively disposed, and effectually prevent illumination from one compartment penetrating to the other.

A rubber backing member 22, corresponding in outline to the outline of the base member 10, is provided at the back of the base member 10, being provided at its periphery with a forwardly projecting flange wall 23 adapted to receive the rim edge 11, and having an inwardly projecting lip 24 which is adapted to extend over the rim of the cover member, as will hereinafter more fully appear, to seal the meeting edges of the base and cover member. Apertures 25 are provided near the ends of the rubber member 22 through which the bolts 19 project, and a central aperture 26 is provided through which the lead wires 16 are extended. The aperture 26 is of such size that it will snugly retain the lead wires 16, while the aperture 17 is substantially larger, so that the lead wires are supported by the aperture 26 out of contact with the edge of the aperture 17, thus preventing any possibility of chafing the insulation covering of the lead wires.

It will be undertsood that the motor vehicle structure upon which the lamp is mounted is provided with three drilled holes arranged to receive the two bolts 19 and the lead wires 16, the bolts being provided with nuts 27 and lock washers 28 which are tightened against the back of the motor vehicle structure to thus draw the base member 10 tightly toward it, the rubber backing member 22 being tightly compressed between the rim 11 of the base member 10 and the surface of the motor vehicle structure to thus provide an effectual seal against the entrance of water between the lamp and the motor vehicle structure. The rubber member 22 is of sufficient thickness so that during the tightening of the bolts 19 it will conform to the contour of the body structure, it being understood that some motor vehicles have flat surfaces at the back while others have a relatively slight curvature, and in this latter case the curvature may vary to a slight extent. In any of these cases the rubber member will permit the lamp to be securely fastened in tightly sealed relation.

The cover member corresponds in outline to the outline of the base, its front wall consisting of an intermediate portion 29 provided with a circular recess 30, and tapered end portions 31 each having a lens receiving opening 32, the edge of this opening being curved inwardly, as shown in Figs. 2 and 4 to provide an inwardly disposed seat for the rim of the lens, as will presently more fully appear. The cover member is provided with a side wall 33 having an outwardly bent rim 34 which seats upon the rim 11 of the base member 10, the lip 24 of the rubber backing member 22 permitting the rim of the cover to be readily engaged or disengaged without disturbing the mounting of the base member 10.

In each of the openings 32 there is provided a lens 35 having an outwardly extending rim 36, the lens projecting outwardly through the opening and having moulded along its intermediate portion an outwardly projecting arrow shaped portion 37.

A shielding and lens securing plate member 38 is provided at the inner side of the cover, its intermediate portion being inwardly offset with respect to the intermediate portion 30 of the cover by bends 39—39, and its end portions being secured to the cover by means of flanged-over eyelets 40 engaged in countersunk holes 41 near each end of the cover and holes 42 near the ends of the plate member, these eyelets providing passages in alignment with the threaded holes 21 of the brackets 18 for receiving the attaching screws 43. The securing of the eyelets tightly draws the end portions of the plate member 38 against the outer end portions of the rims 36 of the lens members.

The inner ends of the flanges 36 are thereupon secured in sealed relation by means of the attaching screw 44 fixed centrally to the base 45 of the autocollimating reflector unit 46, which is mounted in the circular recess 30 of the cover. The reflector unit 46 which is provided with a rim flange 46ª is secured in the base 45 by curling the edge of the base over the flange 46ª, as at 45ª. The screw 44 extends through an aperture 47 in the cover member and an aperture 48 in the plate member and has a nut 49 and lock washer 50 engaged thereon at the inner side of the plate member. Because of the inwardly offset and spaced relation of the intermediate portion of the plate member 38 with respect to the inner surface of the cover member the tightening of the nut 49 draws the plate member toward the inner surface of the cover member thus tightly pressing the rims 36 of the lens members in sealed relation with the edges of the openings 32. At the same time the autocollimating reflector unit is tightly drawn into secured relation in the recess 30, and due to the slight spring pressure set up in the intermediate portion of the plate member there will be no chance of the parts working loose through vibration. This method of securing the lens also compensates for any slight irregularities in the thickness of the yielding molded material of which the lenses are formed.

The plate member 38 is provided in each of its end portions with a pair of slots 51—51 these slots being so arranged that they are within and their outer edges follow the converging upper and lower edges of the openings 32, while their inner edges follow the edges of the arrow formations 37. The lamp bulbs 15 are directly behind the portions of the plate member between the slots and therefore when the bulbs are lighted the center or filament is shielded. This results in a uniform illumination of the slots without glare.

The arrow formations 37 indicate to a following motorist that the lamp is intended to indicate right and left turn signals. However it has been found that such an arrow shape does not provide a distinct pointing signal when illuminated, and therefore the spaced converging slots 51—51 are provided, so that when the lamp is lighted to indicate right or left signals the two converging slots show spaced illuminated strips which distinctly indicate right or left signals, the spacing of the slots being sufficient to keep the lines distinct without diffusion. Figs. 7 and 8 indicate the appearance of the lamp when operated to indicate right or left signals respectively.

In Fig. 9 I have shown the lamp provided with a bracket arm 52, secured to the lower wall portion 33 of the cover member by a bolt 53, the arm being provided at its lower end with a clamp 54 by means of which it may be secured to the bracket portion 55 of the automobile bumper, or to any other suitable part of the automobile structure. In this case the bulbs may be renewed by removing the base member 10 from the cover member.

I have illustrated and described a preferred and satisfactory embodiment of the invention, but it will be obvious that changes may be made therein, within the spirit and scope thereof, as defined in the appended claim.

Having thus described my invention, what I claim and desire to secure by Letters Patent is:

In a direction signal lamp, a base member comprising an intermediate portion, end portions extending longitudinally therefrom at each side, a pair of lamp bulb supporting socket members carried upon said base member at the inner ends of said end portions, a cover member having a front wall and side walls and removably secured to said base member, said cover member including an intermediate portion and end portions extending longitudinally therefrom at each side, said end portions having lens receiving walled apertures and said intermediate portion constituting an opaque spacer between said apertures, a pair of lens members respectively engaged in said apertures, each having a shoulder engaging the wall of said aperture and an outwardly extending relatively narrow flange portion projecting beyond said aperture at the under side of said cover member, the inner ends of said flange portions of said lens members being spaced from each other longitudinally by and being at each side of said cover member intermediate portion, a single retaining plate member disposed within said cover member having an intermediate portion and end portions having longitudinally aligned outer end portions, said plate member end portions engaging the flanges of said lens members and having light emitting openings within the outlines of said lens receiving apertures, said plate member intermediate portion being rearwardly spaced from said cover member intermediate portion whereby a free space is provided between them, longitudinally aligned securing means at the longitudinally aligned outer ends of said plate member end portions secured to the cover member end portions longitudinally outwardly of said apertures to secure the outer ends of said pair of lenses in said apertures, and intermeditae bolt means longitudinally aligned with said securing means connected between said plate member intermediate portion and said cover member intermediate portion adapted through said free space to draw said plate and cover member intermediate portions toward each other whereby the inner ends of said lens members are tightly pressed into relation with the underside of said cover member under tension set up in said plate member between said longitudinally aligned securing means by said drawing action of said intermediate longitudinally aligned bolt means.

HENRY J. SAUER.